(12) United States Patent
He et al.

(10) Patent No.: US 12,125,207 B2
(45) Date of Patent: Oct. 22, 2024

(54) IMAGE SEGMENTATION METHOD AND APPARATUS AND IMAGE THREE-DIMENSIONAL RECONSTRUCTION METHOD AND APPARATUS

(71) Applicants: Beijing BOE Optoelectronics Technology Co., Ltd., Beijing (CN); BOE TECHNOLOGY GROUP CO., LTD., Beijing (CN)

(72) Inventors: Huidong He, Beijing (CN); Hao Zhang, Beijing (CN); Lili Chen, Beijing (CN); Peng Han, Beijing (CN); Qianwen Jiang, Beijing (CN); Juanjuan Shi, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 605 days.

(21) Appl. No.: 17/312,156

(22) PCT Filed: Sep. 11, 2020

(86) PCT No.: PCT/CN2020/114752
§ 371 (c)(1),
(2) Date: Jun. 9, 2021

(87) PCT Pub. No.: WO2022/052032
PCT Pub. Date: Mar. 17, 2022

(65) Prior Publication Data
US 2022/0327710 A1 Oct. 13, 2022

(51) Int. Cl.
*G06T 7/11* (2017.01)
*G06V 10/56* (2022.01)
*G06V 10/75* (2022.01)

(52) U.S. Cl.
CPC ............... *G06T 7/11* (2017.01); *G06V 10/56* (2022.01); *G06V 10/751* (2022.01)

(58) Field of Classification Search
CPC ... G06T 7/11; G06T 2207/10024; G06T 7/00; G06V 10/56; G06V 10/751; G06V 10/26; G06V 10/28
See application file for complete search history.

(56) References Cited

U.S. PATENT DOCUMENTS 9,299,009 B1    3/2016  Arora et al.
2016/0155025 A1* 6/2016  Arora ..................... G06F 18/23
                                                  382/165

(Continued)

FOREIGN PATENT DOCUMENTS

CN      103337064 A    10/2013
CN      104967761 A    10/2015

(Continued)

*Primary Examiner* — Edward F Urban
*Assistant Examiner* — Jongbong Nah
(74) *Attorney, Agent, or Firm* — The Webb Law Firm

(57) ABSTRACT

This disclosure relates to an image segmentation method and apparatus and image three-dimensional reconstruction method and apparatus, and to the field of computer technology. The segmentation method includes: dividing pixels in an image to be segmented among different pixel sets, according to color gamut ranges to which pixel values of the pixels belong; determining matching between pixels in each pixel set according to pixel values; and performing image segmentation on the image to be segmented according to the matching.

17 Claims, 6 Drawing Sheets

(56) References Cited

U.S. PATENT DOCUMENTS

2016/0300358 A1\*  10/2016  Minato .................. G06T 7/136
2017/0195526 A1\*   7/2017  Chen ......................... G06T 7/13
2019/0347767 A1\*  11/2019  Yang .......................... G06T 7/11
2020/0027216 A1\*   1/2020  Hershkovich ........... G06T 7/143
2021/0406593 A1\*  12/2021  Saad ...................... G06V 10/56

FOREIGN PATENT DOCUMENTS

| CN | 105122306 | A |   | 12/2015 |
| CN | 105869177 | A | \* | 8/2016 |
| CN | 109377490 | A |   | 2/2019 |
| CN | 110751660 | A |   | 2/2020 |

\* cited by examiner

IMAGE SEGMENTATION METHOD AND APPARATUS AND IMAGE THREE-DIMENSIONAL RECONSTRUCTION METHOD AND APPARATUS

CROSS-REFERENCE TO RELATED APPLICATION

The present disclosure is a U.S. National Stage Application under 35 U.S.C. § 371 of International Patent Application No. PCT/CN2020/114752, filed on Sep. 11, 2020, the disclosure of which is hereby incorporated into this disclosure by reference in its entirety.

TECHNICAL FIELD

This disclosure relates to the field of computer technology, and in particular, to an image segmentation method, an image segmentation apparatus, an image three-dimensional reconstruction method, an image three-dimensional reconstruction apparatus, an electronic device, a wearable device, and a non-volatile computer-readable storage medium.

BACKGROUND

Image segmentation is one of basic concerns in image processing and computer vision, because it is a key process in many applications of region-specific extraction.

In the related art, an image segmentation method based on edge detection is mostly adopted.

SUMMARY

According to some embodiments of the present disclosure, there is provided an image segmentation method, comprising: dividing pixels in an image to be segmented among different pixel sets according to color gamut ranges to which pixel values of the pixels belong; determining matching between the pixels in each pixel set according to the pixel values; and performing image segmentation on the image to be segmented according to the matching.

In some embodiments, the method further comprises: in a coordinate system with red, green, and blue components of the pixel values as variables, dividing a color gamut cube composed of the red, green, and blue components into a plurality of color gamut sub-cubes as the color gamut ranges.

In some embodiments, the method further comprises: determining one of a vertex of the color gamut cube contained in each color gamut sub-cube, a central point of each color gamut sub-cube or a mean value point of each color gamut sub-cube as a characteristic pixel value of a respective color gamut range; and determining the color gamut range to which the pixel value of each pixel in the image to be segmented belongs according to the characteristic pixel value.

In some embodiments, that determining matching between the pixels in each pixel set according to the pixel values, respectively, comprises: selecting one pixel in any pixel set as a seed pixel; calculating differences between pixel values of other pixels in the pixel set and the pixel value of the seed pixel; and determining whether the other pixels are matched with the seed pixel according to the differences.

In some embodiments, that determining whether the other pixels are matched with the seed pixel according to the differences comprises: determining fuzzy sets to which the other pixels belong by using membership functions according to the differences; and determining whether the other pixels are matched with the seed pixel according to the determined fuzzy sets.

In some embodiments, each of the pixel value comprises the red component, green component and blue component, and that the determining fuzzy sets to which the differences belong by using membership functions comprises: determining the fuzzy sets to which the red components, the green components and the blue components of the other pixels belong according to differences of the red components, differences of the green components and differences of the blue components, respectively.

In some embodiments, that selecting one pixel in any pixel set as a seed pixel comprises: sorting pixels in any pixel set according to differences between the pixel values of the pixels in any pixel set and a characteristic pixel value of a color gamut range to which the pixel set belongs, wherein the characteristic pixel value is one of a vertex of the color gamut cube contained in a color gamut sub-cube corresponding to the color gamut range, a central point of the corresponding color gamut sub-cube, or a mean value point of the corresponding color gamut sub-cube; and selecting sequentially each pixel in the pixel set as the seed pixel according to a sorting result.

In some embodiments, that performing image segmentation on the image to be segmented according to the matching comprises: generating a plurality of sub-images according to the pixels and their matching pixels; merging the plurality of sub-images according to overlapping between the sub-images; and determining an image segmentation result according to a merging result.

In some embodiments, that merging the plurality of sub-images according to overlapping between the sub-images comprises: calculating the number of pixels contained in an intersection between a first sub-image and a second sub-image; determining an overlapping parameter for judging the overlapping according to a ratio of the number of the pixels contained in the intersection to the number of pixels contained in the first sub-image; and merging the first sub-image with the second sub-image when the overlapping parameter is greater than a threshold.

In some embodiments, the method further comprises: determining interference pixels according to pixel value distribution of pixels in an original image; determining matching pixels of the interference pixels according to the pixel values of the pixels in the original image; and removing the interference pixels and the matching pixels thereof in the original image to acquire the image to be segmented.

In some embodiments, the image to be segmented is a two-dimensional image generated according to acquired underwater sonar data.

According to other embodiments of the present disclosure, there is provided an image three-dimensional reconstruction method, comprising: performing image segmentation on an image to be segmented according to the segmentation method of any of the embodiments described above; and performing three-dimensional reconstruction according to a segmentation result to acquire a three-dimensional image.

According to still other embodiments of the present disclosure, there is provided an image segmentation apparatus comprising at least one processor, wherein the processor is configured to perform the steps of: dividing pixels in an image to be segmented among different pixel sets according to color gamut ranges to which pixel values belong; determining matching between the pixels in each pixel set according to the pixel values, respectively; and performing image segmentation on the image to be segmented according to the matching.

In some embodiments, the method further comprises: in a coordinate system with red, green, and blue components of the pixel values as variables, dividing a color gamut cube composed of the red, green, and blue components into a plurality of color gamut sub-cubes as the color gamut ranges.

In some embodiments, the processor is further configured to perform the steps of: determining one of a vertex of the color gamut cube contained in each color gamut sub-cube, a central point of each color gamut sub-cube or a mean value point of each color gamut sub-cube as a characteristic pixel value of a respective color gamut range; and determining the color gamut range to which the pixel value of each pixel in the image to be segmented belongs according to the characteristic pixel value.

In some embodiments, that determining matching between the pixels in each pixel set according to the pixel values, respectively, comprises: selecting one pixel in any pixel set as a seed pixel; calculating differences between pixel values of other pixels in the pixel set and the pixel value of the seed pixel; and determining whether the other pixels are matched with the seed pixel according to the differences.

In some embodiments, that determining whether the other pixels are matched with the seed pixel according to the differences comprises: determining fuzzy sets to which the other pixels belong by using membership functions according to the differences; and determining whether the other pixels are matched with the seed pixels according to the determined fuzzy sets.

In some embodiments, the pixel value comprises the red component, green component and blue component, and that determining fuzzy sets to which the other pixels belong by using membership functions according to the differences comprises: determining fuzzy sets to which the red components, the green components and the blue components of the other pixels belong according to differences of the red components, differences of the green components and differences of the blue components, respectively.

In some embodiments, that selecting one pixel in any pixel set as a seed pixel comprises: sorting pixels in any pixel set according to differences between pixel values of the pixels in any pixel set and a characteristic pixel value of a color gamut range to which the pixel set belongs, wherein the characteristic pixel value is one of a vertex of the color gamut cube contained in a color gamut sub-cube corresponding to the color gamut range, a central point of the corresponding color gamut sub-cube, or a mean value point of the corresponding color gamut sub-cube; and selecting sequentially each pixel in the pixel set as the seed pixel according to a sorting result.

In some embodiments, that performing image segmentation on the image to be segmented according to the matching comprises: generating a plurality of sub-images according to the pixels and their matching pixels; merging the sub-images according to overlapping between the sub-images; and determining an image segmentation result according to a merging result.

In some embodiments, that merging the sub-images according to overlapping between the sub-images comprises: calculating the number of pixels contained in an intersection between a first sub-image and a second sub-image; determining an overlapping parameter for judging the overlapping according to a ratio of the number of the pixels contained in the intersection to the number of pixels contained in the first sub-image; merging the first sub-image with the second sub-image when the overlapping parameter is greater than a threshold.

In some embodiments, the processor is further configured to perform the steps of: determining interference pixels according to pixel value distribution of pixels in an original image; determining matching pixels of the interference pixels according to the pixel value of the pixels in the original image; and removing the interference pixels and the matching pixels thereof in the original image to acquire the image to be segmented.

In some embodiments, the image to be segmented is a two-dimensional image generated according to acquired underwater sonar data.

According to further embodiments of the present disclosure, there is provided an image three-dimensional reconstruction apparatus comprising at least one processor, wherein the processor is configured to perform the steps of: performing image segmentation on an image to be segmented according to the segmentation method of any of the embodiments described above; and performing three-dimensional reconstruction according to a segmentation result to acquire a three-dimensional image.

According to further embodiments of the present disclosure, there is provided a wearable device comprising: the image three-dimensional reconstruction apparatus in any of the embodiments described above; and a display screen used for displaying a three-dimensional image acquired by the three-dimensional reconstruction apparatus.

In some embodiments, the three-dimensional reconstruction apparatus generates an image to be segmented according to acquired underwater sonar data, and reconstructs the three-dimensional image according to a segmentation result of the image to be segmented.

According to further embodiments of the present disclosure, there is provided an electronic device comprising: a memory; and a processor coupled to the memory, wherein the processor is configured to perform the image segmentation method or the image three-dimensional reconstruction method according to any of the embodiments described above based on instructions stored in the memory.

According to further embodiments of the present disclosure, there is provided a non-transitory computer-readable storage medium having stored thereon computer programs which, when executed by a processor, implement the image segmentation method or the image three-dimensional reconstruction method according to any of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings described herein provide a further understanding of the present disclosure, and constitute a part of this application, and the illustrative embodiments of the present disclosure, together with the description thereof, serve to explain the present disclosure and not to limit the present disclosure improperly. In the drawings.

DETAILED DESCRIPTION

Figure 1:
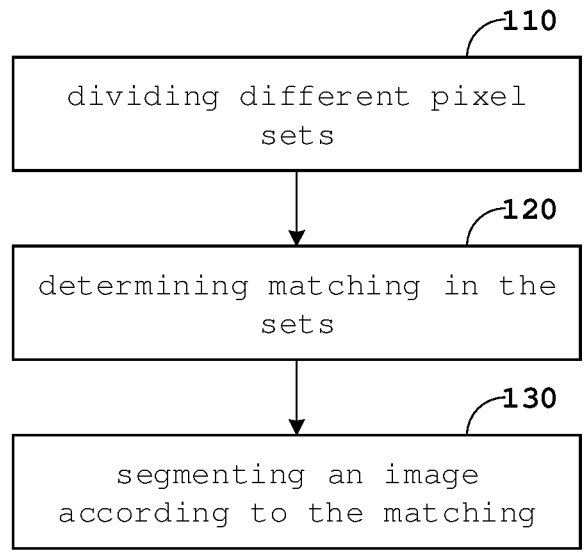
FIG. 1 illustrates a flow diagram of an image segmentation method according to some embodiments of the present disclosure.

The technical solution in the embodiments of the present disclosure will be described clearly and completely below with reference to the drawings in the embodiments of the present disclosure, and it is obvious that the embodiments described are only some of the embodiments of the present disclosure, rather than all embodiments. The following description of at least one exemplary embodiment is merely illustrative in nature and is in no way intended to limit the present disclosure, its application, or utilizations. All other embodiments, which can be derived by one of ordinary skill in the art based on the embodiments disclosed herein without making creative work, are intended to be within the scope of the present disclosure.

The relative arrangement of components and steps, numerical expressions and numerical values set forth in these embodiments do not limit the scope of the present disclosure unless specifically stated otherwise. Meanwhile, it should be understood that the sizes of various portions shown in the drawings is not drawn to actual scale for the convenience of description. The technique, method, and apparatus known to one of ordinary skill in the relevant art may not be discussed in detail but are intended to be part of the specification where appropriate. In all examples shown and discussed herein, any particular value should be construed as exemplary only and not as limiting. Thus, other examples of the exemplary embodiments may have different values. It should be noted that: similar reference numbers and letters refer to similar items in the following figures, and thus, once an item is defined in one figure, it need not be discussed further in subsequent figures.

The inventors of the present disclosure have found the following problem in the related art described above. Image segmentation methods using binarization or based on RGB (Red, Green, Blue) color space are both based on a segmentation principle, i.e. each pixel being classified into a unique subset.

However, such a rough segmentation principle cannot accurately identify different image regions, resulting in low image segmentation accuracy.

Moreover, since different observers have different understandings of image colors, such a segmentation method cannot well reflect human beings' understandings of images, resulting in the low image segmentation accuracy.

The low image segmentation accuracy may cause poor effect of subsequent processing.

For example, in information contained in original underwater sonar data, sea water, sea floor, and object have completely different characteristics. In three-dimensional visualization imaging process after image segmentation, the three also have different opacities and colors. Thus, the above segmentation method often makes the object at segmentation lines of each region be covered, resulting in poor three-dimensional imaging effect.

In view of this, the present disclosure provides a technical solution for image segmentation. According to the technical solution, pixels whose pixel values belong to a same color gamut range are grouped into a same pixel set, and pixel values are matched in each pixel set, so that an image segmentation result is determined.

In this way, the division of a color gamut space can be refined, so that the recognition rate of different image regions is improved, and thus, the image segmentation accuracy is improved.

For example, the technical solution of the present disclosure can be implemented by the following embodiments.

FIG. 1 illustrates a flow diagram of an image segmentation method according to some embodiments of the present disclosure.

As shown in FIG. 1, the method comprises: step 110, dividing different pixel sets; step 120, determining matching in the sets; and step 130, segmenting an image according to the matching.

In the step 110, pixels in an image to be segmented are divided among different pixel sets according to color gamut ranges to which pixel values belong. For example, the image to be segmented is a two-dimensional image generated according to acquired underwater sonar data.

For example, a pixel set to which each pixel belongs can be determined according to a difference between the pixel value of each pixel and a characteristic pixel of each color gamut range, so as to realize pixel classification.

In this way, similar pixels can be classified into one class, to realize preliminary image segmentation; and the pixel values are further matched in each class, to improve image segmentation accuracy.

In some embodiments, before the step 110 is performed, the entire color gamut can be modeled, and is divided into a plurality of color gamut ranges based on the modeling. On this basis, the color gamut range to which the pixel value of each pixel in the image to be segmented belongs can be determined. For example, color gamut modeling and dividing can be achieved through the embodiment in FIG. 2.

Figure 2:
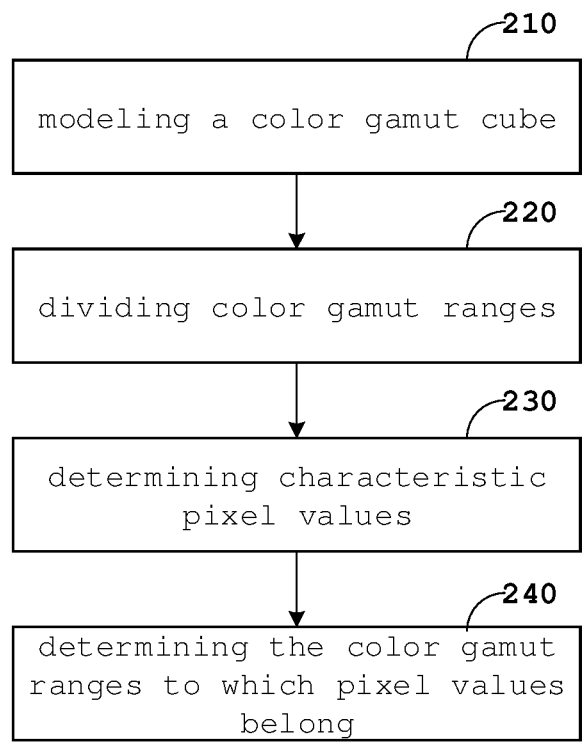
FIG. 2 illustrates a flow diagram of an image segmentation method according to other embodiments of the present disclosure.

FIG. 2 illustrates a flow diagram of an image segmentation method according to other embodiments of the present disclosure.

As shown in FIG. 2, the method further comprises: step 210, modeling a color gamut cube; step 220, dividing color gamut ranges; step 230, determining characteristic pixel values; and step 240, determining the color gamut ranges to which pixel values belong.

In the step 210, according to value ranges of red, green, and blue components of the pixel values, the entire color gamut is modeled as a color gamut cube in a coordinate system with the red, green, and blue components as variables.

In the step 220, the color gamut cube is divided into a plurality of color gamut sub-cubes as color gamut ranges. For example, a color gamut cube can be modeled and divided into color gamut sub-cubes through the embodiment in FIG. 3.

Figure 3:
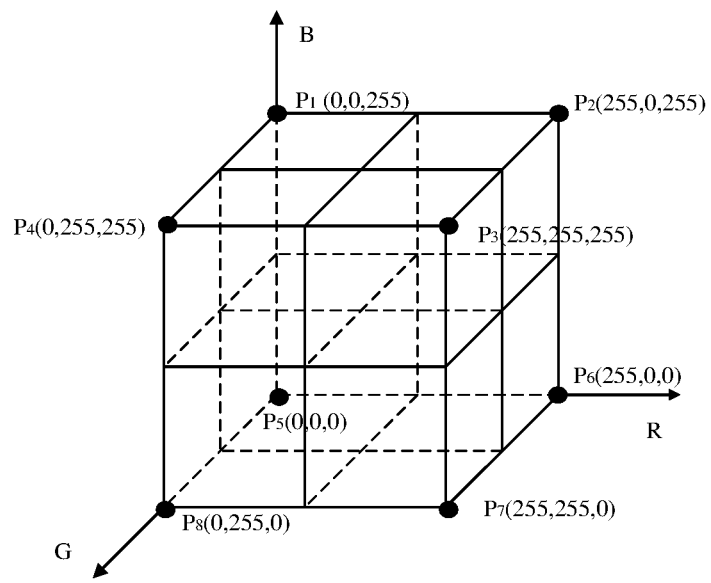
FIG. 3 illustrates a schematic diagram of an image segmentation method according to some embodiments of the present disclosure.

FIG. 3 illustrates a schematic diagram of an image segmentation method according to some embodiments of the present disclosure.

As shown in FIG. 3, 3 coordinate values of the coordinate system represent values of 3 components R (red component), G (green component), and B (blue component) of a pixel value, respectively. In the entire color gamut, a value range of each component is [0, 255], and the pixel value (0, 0, 0) of origin P5 represents black. A cube with vertexes P1 to P8 is a color gamut cube corresponding to the entire color gamut, i.e. a color gamut space.

In some embodiments, the color gamut cube can be divided at 127-pixel-value intervals in directions of the 3 components into 8 color gamut sub-cubes, i.e., color gamut subspaces, which contain respectively the vertexes P1 to P8. For example, the vertexes P1 to P8 represent blue, pink, white, cyan, black, red, yellow, and green, respectively. Each color gamut sub-cubes represent a different color gamut range according to the contained vertexes, respectively, i.e. pixel values within a same color gamut range have similar color information.

After modeling the color gamut cube and color gamut sub-cubes, it can be continued that the color gamut range to which the pixel value of each pixel in the image to be segmented belongs is determined through the embodiment in FIG. 2.

In the step 230, the vertex of the color gamut cube contained in each gamut sub-cube are determined as the characteristic pixel value of a respective color gamut range. For example, any pixel value characterizing the respective color gamut range in each color gamut sub-cube can be determined as a characteristic pixel value, such as a vertex, a center point, a mean value point, and so on.

In the step 240, the color gamut range to which the pixel value of each pixel in the image to be segmented belongs is determined according to the characteristic pixel values. For example, a color gamut range to which a pixel belongs is determined according to a difference between the pixel and each characteristic pixel. The pixel values of the pixel can be taken as multi-dimensional eigenvectors, and the difference between the pixels can be determined by calculating the similarity (such as Euclidean distance, Ming's distance, Mahalanobis distance, etc.) between the eigenvectors.

In some embodiments, distances between the point corresponding to each pixel in the image to be segmented and the 8 vertexes of the color gamut cube are calculated in a RGB coordinate system, respectively. For example, the distances are calculated by the following formula:

$$d_i(n,m) = \Sigma[p(n,m)_{RGB} - v^i_{RGB}]^2 \quad i=1, 2, \ldots 8$$

where $p(n,m)_{RGB}$ is a point defined by any pixel in a color image to be segmented in the RGB coordinate system, $v^i_{RGB}$ is a vertex i of the color gamut cube, and $d_i(n,m)$ is a distance between the point and the vertex.

For example, each pixel would be calculated to get 8 respective distances. By comparing these 8 distances, the pixel are divided into a color gamut sub-cube with the vertex corresponding to the shortest distance. In this way, the pixels in the image to be segmented are spatially classified one by one.

Thus, the number of pixels contained in each subspace can be clearly located. For example, a color gamut sub-cube without any pixel will not be subsequently processed. Moreover, after spatial classification, repeated computation of same pixels can be avoided in further processing (e.g., fuzzy color extraction).

After the color gamut ranges to which the pixel values belong are determined, it can be continued that image segmentation is performed through the embodiment in FIG. 1.

In the step 120, matching between the pixels in each pixel set is determined according to the pixel values, respectively. In this way, compared with purposeless matching in the entire color gamut, purposeful matching only for pixels belonging to the same color gamut range (e.g. belonging to one color type) can improve the efficiency and accuracy of matching, so as to improve the efficiency and accuracy of image segmentation based on a matching result.

Figure 4:
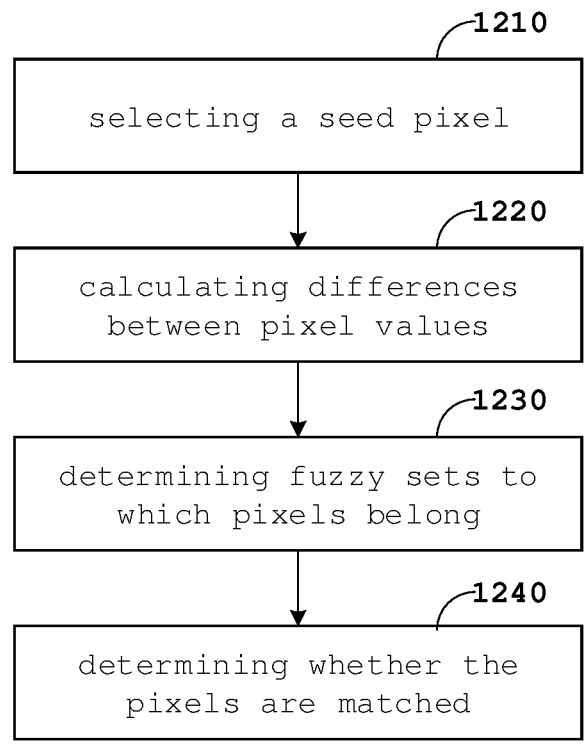
FIG. 4 illustrates a flow diagram of step 120 in FIG. 1 according to some embodiments.

In some embodiments, the step 120 can be implemented through the embodiment in FIG. 4.

FIG. 4 illustrates a flow diagram of step 120 in FIG. 1 according to some embodiments.

As shown in FIG. 4, the step 120 comprises: step 1210, selecting a seed pixel; step 1220, calculating differences between pixel values; step 1230, determining fuzzy sets to which pixels belong; and step 1240, determining whether the pixels are matched.

In the step 1210, one pixel in any pixel set is selected as a seed pixel.

In some embodiments, pixels in any pixel set are sorted according to differences between pixel values of the pixels in any pixel set and the characteristic pixel value of the color gamut range to which the pixel set belongs; and each pixel in the pixel set is sequentially selected as the seed pixel according to a sorting result.

In some embodiments, the pixels in each pixel set are sorted in an ascending order according to the distances between the pixels and a vertex contained in the respective color gamut sub-cube. Starting from a nearest point, each pixel is taken as the seed pixel by means of polling to perform fuzzy color extraction.

In some embodiments, if a certain seed pixel cannot find its matching pixel, the seed pixel is discarded and a next pixel within the respective color gamut sub-cube is taken as the seed pixel. And so on, the seed pixels are selected sequentially for matching. For example, the selection and matching of seed pixels can be performed simultaneously within the 8 color gamut sub-cubes.

In the step 1220, differences between pixel values of other pixels in the pixel set and the pixel value of the seed pixel are calculated.

Based on the differences, it can be determined whether the other pixels are matched with the seed pixel. For example, fuzzy color extraction is performed through the steps 1230 and 1240, and thus the matching is determined.

In the step 1230, the fuzzy sets to which the differences belong are determined by using membership functions and fuzzy logic.

In some embodiments, the pixel value comprises the red component, green component and blue component, and the fuzzy sets to which the red, green and blue components of the other pixels belong are determined according to differences of the red components, differences of the green components and differences of the blue components, respectively.

In some embodiments, an FCE (Fuzzy Color Extractor) can be created to extract pixels similar to the seed pixel (seed). For example, for a pixel p(n, m), its sub-pixel components in a RGB space are $p(n, m)_R$, $p(n, m)_G$ and $p(n, m)_B$, respectively. A pixel currently desired to be processed is a seed, and its RGB components are $seed_R$, $seed_G$, and $seed_B$, respectively. The selection of the seed can be performed according to algorithm requirement, or determined according to a pixel desired to be processed in the image.

Color component differences between any pixel p(n, m) and the seed are calculated as follows:

$$\begin{cases} dif(n, m)_R = p(n, m)_R - seed_R \\ dif(n, m)_G = p(n, m)_G - seed_G \quad 0 \le m < M, 0 \le n < N \\ dif(n, m)_B = p(n, m)_B - seed_B \end{cases}$$

where M and N represent image sizes (positive integers). The fuzzy sets to which the color component differences belong can be calculated by using preset membership functions according to the color component differences.

Figure 5:
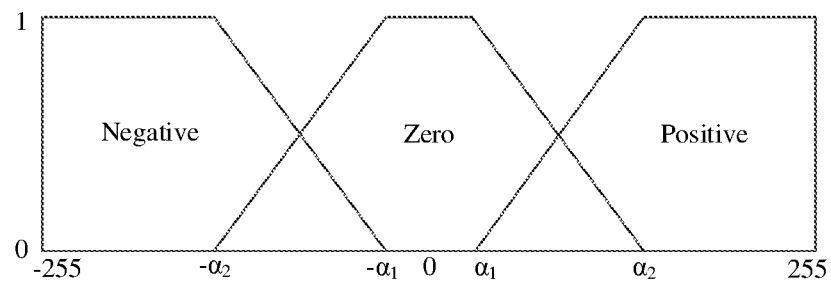
FIG. 5 illustrates a schematic diagram of an image segmentation method according to other embodiments of the present disclosure.

In some embodiments, the respective membership functions of the fuzzy sets can be determined through the embodiment in FIG. 5.

FIG. 5 illustrates a schematic diagram of an image segmentation method according other embodiments of to the present disclosure.

As shown in FIG. 5, the fuzzy sets to which the color component differences belong comprise a Zero set, a Negative set, and a Positive set. The 3 function curves correspond to the membership functions of the 3 fuzzy sets, respectively. The longitudinal axis represents function values of the membership functions, namely membership degrees of the differences belonging to the fuzzy sets; and the horizontal axis represents values of the differences. $\alpha_1$ and $\alpha_2$ are adjustable fuzzy thresholds set according to actual conditions and prior knowledge.

In the case that the membership functions are determined, the matching of the pixels can be determined through the step 1240 in FIG. 4.

In the step 1240, it is determined whether the other pixels are matched with the seed pixel based on the determined fuzzy sets.

Through fuzzy calculation, matched fuzzy set and unmatched fuzzy sets are obtained, and through defuzzification, pixels finally extracted (namely pixels matched with the seed) are obtained.

In some embodiments, the fuzzy logic can be:
when $dif(n, m)_R$, $dif(n, m))_G$ and $dif(n, m)_B$ all belong to the Zero set, the pixel $p(n, m)_{RGB}$ is matched with the seed; and
when $dif(n, m)_R$ or $dif(n, m))_G$ or $dif(n, m)_B$ belongs to the Negative or Positive set, $p(n, m)_{RGB}$ is not matched with the seed.

In the embodiment described above, the fuzzy logic is configured by using a language method, input and output functions are simple, and an accurate mathematical model is eliminated, so that the calculation amount is optimized. A fuzzy matching method with strong robustness is suitable for solving problems of nonlinearity, strong coupling time variation and hysteresis in the classification process, so that the accuracy rate of image segmentation is improved. The fuzzy matching method with strong fault tolerance can adapt to changes of controlled object's own characteristics and environmental characteristics.

Therefore, a fuzzy color extraction algorithm is suitable for image segmentation in a complex environment (such as an underwater sonar data image), and can improve the image segmentation accuracy.

On the basis that the matching is determined, image segmentation can be performed through the step 130 in FIG. 1.

In the step 130, according to the matching, image segmentation on the image to be segmented is performed.

Figure 6:
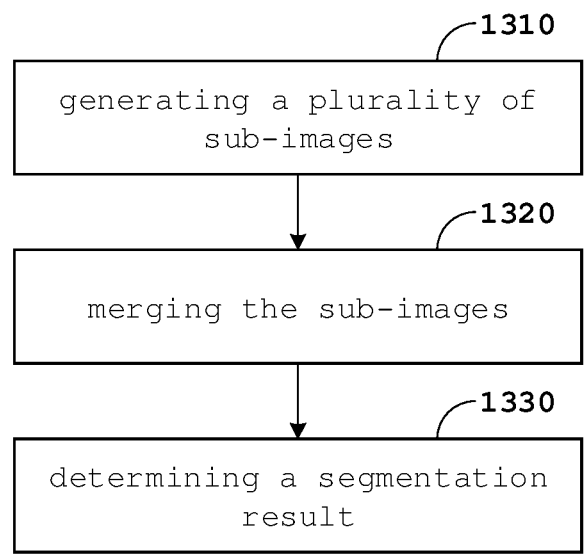
FIG. 6 illustrates a flow diagram of step 130 in FIG. 1 according to some embodiments.

In some embodiments, image segmentation can be performed through the embodiment in FIG. 6.

FIG. 6 illustrates a flow diagram of step 130 in FIG. 1 according to some embodiments.

As shown in FIG. 6, the step 130 can comprise: step 1310, generating a plurality of sub-images; step 1320, merging the sub-images; and step 1330, determining a segmentation result.

In the step 1310, the plurality of sub-images are generated, according to each pixel and its matching pixels. For example, each time fuzzy color extraction is performed, a sub-image can be acquired based on a seed pixel and its matching pixels.

Due to spatial similarity of pixels, sub-images corresponding to seed pixels with close pixel values typically have overlapping portions. In the case that multiple sub-images share a common color area in the RGB space, it may even happen that a certain sub-image completely covers another one.

Therefore, it is needed to merge a series of sub-images obtained, according to a certain method to form a finally segmented image.

In the step 1320, the sub-images are merged, according to the overlapping between the sub-images. If two sub-images have spatial and color similarity, it is considered that the two sub-images share a common area and can be connected together to form one image partition.

In some embodiments, the sub-images comprise a first sub-image and a second sub-image. The number of pixels contained in an intersection of the first sub-image and the second sub-image is calculated; an overlapping parameter is determined as the overlapping according to a ratio of the number of the pixels contained in the intersection to the number of the pixels contained in the first sub-image; and the first sub-image is merged with the second sub-image in the case that the overlapping parameter is greater than a threshold.

For example, two sub-images are $I_{SAMPLE}^{(i)}$ and $I_{SAMPLE}^{(l)}$, respectively, and an overlapping parameter can be determined by using the following formula:

$$NUM(I_{SAMPLE}^{(i)} \cap I_{SAMPLE}^{(l)})/NUM(I_{SAMPLE}^{(i)})$$

where NUM ( ) represents taking the number of pixels in brackets. The common area size of the two sub-images in the RGB space can be detected according to the overlapping parameter. In the case that the overlapping parameter is greater than the threshold, it is considered that the sub-images $I_{SAMPLE}^{(i)}$ and $I_{SAMPLE}^{(l)}$ have similarity and can be merged. For example, the threshold can be set in an algorithm. In order to perform image segmentation more accurately, the threshold can be set larger, e.g., 90, 100, etc.

In the step 1330, according to a merging result, an image segmentation result is determined. By merging, extraction and image segmentation of different areas (such as water body and stratum in an underwater image) in an image can be achieved.

In some embodiments, in some complex imaging environments, there are interferences of many unknown factors in an original image. For example, a seabed environment is complex, and a dynamic range of sonar data obtained by scanning is very small, so that there are many interferences in an underwater sonar image. Therefore, the image can be preprocessed by using logarithmic transformation, thereby expanding the dynamic range of data and reducing interferences. For example, preprocessing such as de-noising and enhancing contrast can be performed on the original image.

Figure 7:
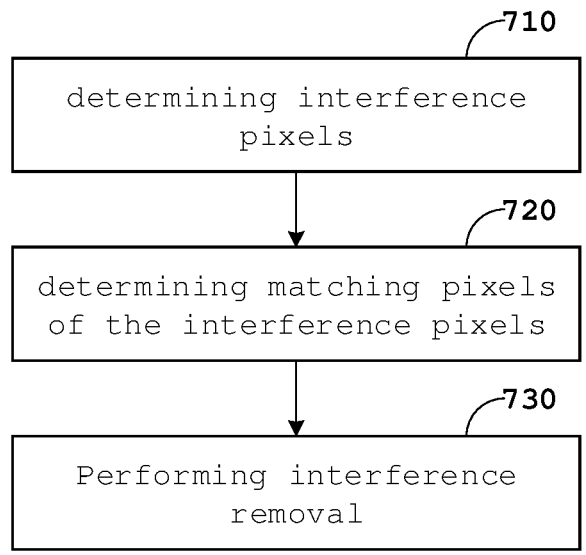
FIG. 7 illustrates a schematic diagram of an image segmentation method according to still other embodiments of the present disclosure.

In some embodiments, before the step 110 is performed, the interferences in the image can be removed through the embodiment in FIG. 7.

FIG. 7 illustrates a schematic diagram of an image segmentation method according to still other embodiments of the present disclosure.

As shown in FIG. 7, the method can further comprise: step 710, determining interference pixels; step 720, determining matching pixels of the interference pixels; and step 730, performing interference removal.

In the step 710, the interference pixels are determined according to pixel value distribution of the pixels in the original image. For example, interference pixels can be selected according to prior knowledge and actual requirements.

In some embodiments, the interference pixels can be selected according to prior knowledge. For example, a color range (e.g., red color gamut, etc.) of interference factors in an image has been determined, and pixels within the color range can be determined as interference pixels.

In some embodiments, a center point (127, 127, 127) of the RGB space cannot be accurately classified into any color subspace, which will cause great interference in color extraction. Therefore, the seed pixel seed=(127, 127, 127) can also be selected as the interference pixel for fuzzy color extraction.

In the step 720, matching pixels of the interference pixels are determined according to the pixel values of the pixels in the original image. For example, matching can be performed through the method (such as fuzzy color extraction) in any of the embodiments described above.

In the step 730, the interference pixels and the matching pixels thereof are removed from the original image, to acquire the image to be segmented. For example, for an input original image $I_{SOURCE}$, an interference image $I_{INT}$ composed of interference pixels and matching pixels can be determined. A color image (matching pixels) close to the interference pixels in the original image can be removed through $I_{SOURCE}$-$I_{INT}$ to obtain a required image $I_{SAMPLE}$ to be segmented.

In some embodiments, according to the segmentation method of any of the embodiments described above, image segmentation is performed on the image to be segmented; and according to the segmentation result, three-dimensional reconstruction is performed to obtain the three-dimensional image.

In some embodiments, in a two-dimensional image obtained by performing image segmentation on an underwater sonar image, different areas such as the ocean, stratum and objects can be identified. According to three-dimensional entities with rich information contained in original underwater sonar data, three-dimensional structure reconstruction (such as a Unity 3D tool) can be performed on the segmented two-dimensional image. Further, three-dimensional visualization effect can be achieved by using volume rendering techniques.

For example, in a process of volume rendering, it is not needed to construct a geometric image of an intermediate process, but is only needed to process a three-dimensional data volume to show its internal details. Such three-dimensional reconstruction is simple to perform and fast to convert.

In some embodiments, three-dimensional visualization can be achieved through a VTK (Visualization Toolkit).

In the embodiment described above, water body can be separated from a bottom layer effectively, and objects (such as underwater buried mines, bombs) can be extracted with high accuracy. In the field of color image segmentation, this can well solve the uncertainty and fuzziness in practical applications, and is suitable for different observers to focus on different colors in different color spaces.

In the subsequent three-dimensional visualization process, a three-dimensional scene is constructed by using a Unity platform. A very complex three-dimensional image and scene can be constructed by a user within a very short understanding time, which greatly improves work efficiency.

By using the volume rendering method based on the VTK toolkit, the processed three-dimensional data is represented through proper geometric figures, colors and brightness, and is mapped to a two-dimensional image plane. Finally, the three-dimensional image can be rendered in a VR (Virtual Reality) head-mounted device, so that the user can watch the sonar image in a virtual environment and the sense of immersion is enhanced.

In some embodiments, an image segmentation apparatus comprises at least one processor configured to perform the image segmentation method in any of the embodiments described above.

In some embodiments, an image three-dimensional reconstruction apparatus comprises at least one processor configured to perform: image segmentation on an image to be segmented according to the segmentation method of any of the embodiments described above; and three-dimensional reconstruction according to the segmentation result to acquire a three-dimensional image.

Figure 8:
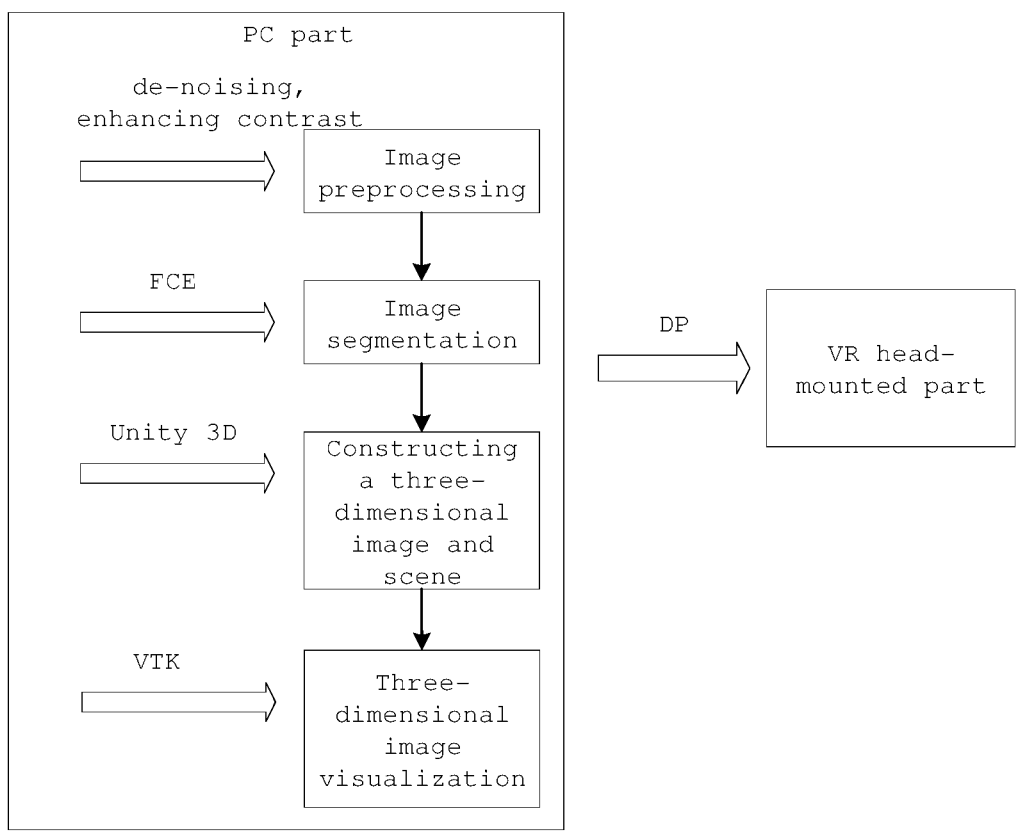
FIG. 8 illustrates a schematic diagram of a wearable device according to some embodiments of the present disclosure.

FIG. 8 illustrates a schematic diagram of a wearable device according to some embodiments of the present disclosure.

As shown in FIG. 8, the wearable device can adopt a VR split structure comprising: a PC (Personal Computer) part (such as an image reconstruction device) and a VR head-mounted part (such as a display screen).

In some embodiments, processes such as image preprocessing, image segmentation, volume rendering can be performed in the PC part, and then the obtained three-dimensional image is rendered into the VR head-mounted part through a DP (Display Port).

For example, the image preprocessing can comprise de-noising, enhancing contrast, etc.; the image segmentation can comprise FCE of any of the embodiments described above; and a three-dimensional image and scene are constructed by using the Unity 3D, and three-dimensional image visualization is performed by using the VTK.

In some embodiments, after the image segmentation is performed on a sonar data image, it can be displayed in a virtual reality head-mounted device by volume rendering techniques. In this way, it enables a user to observe a three-dimensional image of water body-stratum-object of the underwater sonar data in a VR scene.

Figure 9:
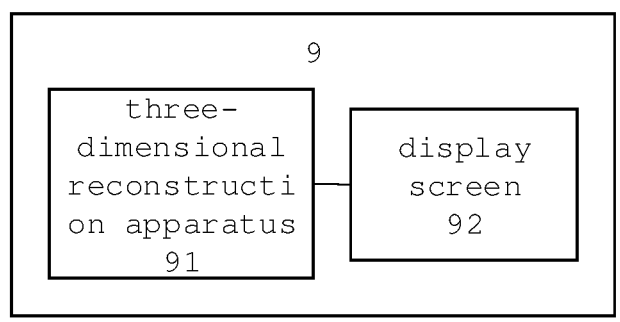
FIG. 9 illustrates a block diagram of a wearable device according to some embodiments of the present disclosure.

FIG. 9 illustrates a block diagram of a wearable device according to some embodiments of the present disclosure.

As shown in FIG. 9, the wearable device 9 comprises: an image three-dimensional reconstruction apparatus 91 in any of the above embodiments; and a display screen 92 for displaying a three-dimensional image acquired by the three-dimensional reconstruction apparatus 91.

In some embodiments, the three-dimensional reconstruction device 91 generates the image to be segmented according to the acquired underwater sonar data, and reconstructs the three-dimensional image according to the segmentation result of the image to be segmented.

Figure 10:
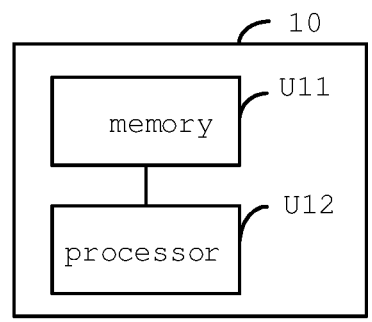
FIG. 10 illustrates a block diagram of an electronic device according to some embodiments of the present disclosure.

FIG. 10 illustrates a block diagram of an electronic device according to some embodiments of the present disclosure.

As shown in FIG. 10, the electronic device 10 of these embodiments comprises: a memory U11 and a processor U12 coupled to the memory U11, wherein the processor U12 is configured to perform the image segmentation method or the image three-dimensional reconstruction method in any of the embodiments of the present disclosure based on instructions stored in the memory U11.

The memory U11 can comprise, for example, a system memory, a fixed non-volatile storage medium, etc. The system memory has stored thereon, for example, an operating system, an application program, a Boot Loader, a database, and other programs.

Figure 11:
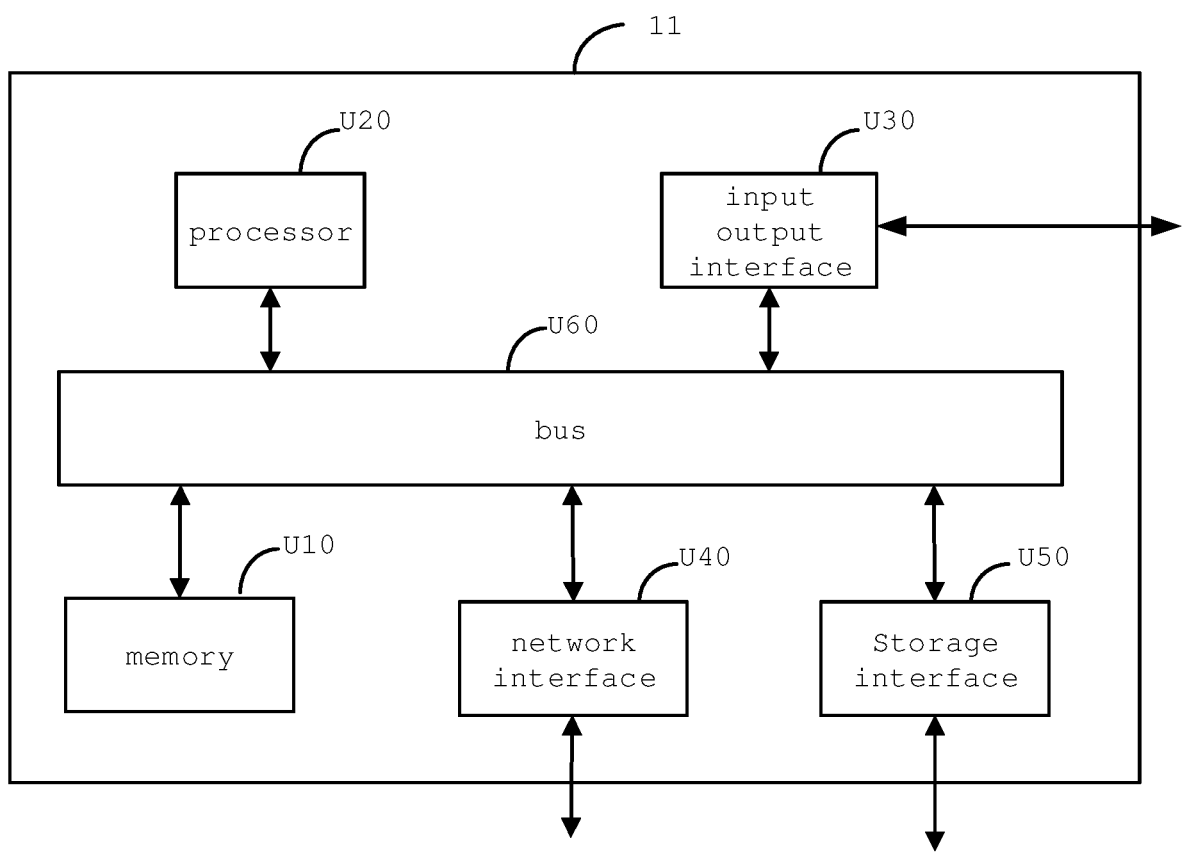
FIG. 11 illustrates a block diagram of an electronic device according to other embodiments of the present disclosure.

FIG. 11 illustrates a block diagram of an electronic device according to other embodiments of the present disclosure.

As shown in FIG. 11, the electronic device 11 of these embodiments comprises: a memory U10 and a processor U20 coupled to the memory U10, wherein the processor U20 is configured to perform the image segmentation method or the image three-dimensional reconstruction method in any of the foregoing embodiments based on instructions stored in the memory U10.

The memory U10 can comprise, for example, a system memory, a fixed non-volatile storage media, etc. The system memory has stored thereon, for example, an operating system, an application program, a Boot Loader, and other programs.

The electronic device 6 can further comprise an input output interface U30, a network interface U40, a storage interface U50, etc. These interfaces U30, U40, U50, and the memory U10 can be connected with the processor U20, for example, via a bus U60. The input output interface U30 provides connection interfaces for input output devices such as a display, a mouse, a keyboard, a touch screen, a microphone, and a sound box. The network interface U40 provides connection interfaces for various networking devices. The storage interface U50 provides connection interfaces for external storage devices such as SD cards and U disks.

As will be appreciated by those skilled in the art, the embodiments of the present disclosure may be provided as a method, system, or computer program product. Accordingly, the present disclosure may take the form of an entire hardware embodiment, an entire software embodiment or an embodiment combining software and hardware aspects. Furthermore, the present disclosure may take the form of a computer program product implemented on one or more computer-usable non-transitory storage media (comprising, but not limited to, disk storage, CD-ROM, optical storage, and so forth) having computer-usable program code embodied therein.

So far, the detailed description has been made according to the present disclosure. Some details well known in the art have not been described in order to avoid obscuring the concepts of the present disclosure. Those skilled in the art can now fully appreciate how to implement the technical solution disclosed herein, in view of the foregoing description.

The method and system of the present disclosure may be implemented in a number of ways. For example, the method and system of the present disclosure may be implemented in software, hardware, firmware, or any combination of software, hardware, and firmware. The above-described order for the steps of the method is for illustration only, and the steps of the method of the present disclosure are not limited to the order specifically described above unless specifically stated otherwise. Further, in some embodiments, the present disclosure may also be implemented as programs recorded in a recording medium, and these programs comprise machine-readable instructions for implementing the method according to the present disclosure. Thus, the present disclosure also covers the recording medium storing the programs for performing the method according to the present disclosure.

Although some specific embodiments of the present disclosure have been described in detail by way of example, it should be understood by those skilled in the art that the above examples are for illustration only and are not intended to limit the scope of the present disclosure. It will be appreciated by those skilled in the art that modifications can be made to the above embodiments without departing from the scope and spirit of the present disclosure. The scope of the present disclosure is defined by the appended claims.

What is claimed is:

1. An image segmentation method, comprising:
dividing pixels in an image to be segmented among different pixel sets, according to color gamut ranges to which pixel values of the pixels belong;
within each pixel set, determining matching between pixels in a same pixel set according to pixel values; and
performing image segmentation on the image to be segmented according to the matching;
in a coordinate system with red, green, and blue components of pixel values as variables, dividing a color gamut cube composed of the red, green, and blue components into a plurality of color gamut sub-cubes as the color gamut ranges;
determining one of a vertex of the color gamut cube contained in each color gamut sub-cube, a central point of each color gamut sub-cube or a mean value point of each color gamut sub-cube as a characteristic pixel value of color gamut range corresponding to the each color gamut sub-cube; and
determining the color gamut range to which the pixel value of each pixel in the image to be segmented belongs, according to the characteristic pixel value;
wherein the determining the color gamut range to which the pixel value of the each pixel in the image to be segmented belongs comprises:
obtaining an eigenvector of the each pixel and an eigenvector of a characteristic pixel, using a processor;
calculating a vector distance between the eigenvector of the each pixel and the eigenvector of the characteristic pixel, using the processor; and
determining the color gamut range to which the pixel value of the each pixel belongs based on the vector distance, using the processor; and
the determining matching between the pixels in each pixel set according to pixel values, respectively comprises:
selecting one pixel in any pixel set as a seed pixel;
calculating differences between the pixel value of the seed pixel and pixel values of other pixels in the pixel set; and
determining whether the other pixels are matched with the seed pixel, according to the differences.

2. The segmentation method according to claim 1, wherein the determining whether the other pixels are matched with the seed pixel, according to the differences comprises:
  determining fuzzy sets to which the differences belong by using membership functions; and
  determining whether the other pixels are matched with the seed pixel, according to fuzzy logic and the determined fuzzy sets.

3. The segmentation method according to claim 2, wherein:
  each of the pixel value comprises red component, green component and blue component, the differences comprise differences of the red components, differences of the green components and differences of the blue components; and
  the determining fuzzy sets to which the differences belong by using membership functions comprises: determining the fuzzy sets to which the red components, the green components and the blue components of the other pixels belong, according to differences of the red components, differences of the green components and differences of the blue components, respectively.

4. The segmentation method according to claim 1, wherein the selecting one pixel in any pixel set as a seed pixel comprises:
  sorting pixels in any pixel set, according to differences between pixel values of the pixels in the pixel set and a characteristic pixel value of a color gamut range to which the pixel set belongs, wherein the characteristic pixel value is one of a vertex of a color gamut cube contained in a color gamut sub-cube corresponding to the color gamut range, a central point of the color gamut sub-cube, or a mean value point of the corresponding color gamut sub-cube; and
  selecting sequentially each pixel in the pixel set as the seed pixel, according to a result of the sorting.

5. The segmentation method according to claim 1, wherein the performing image segmentation on the image to be segmented according to the matching comprises:
  generating a plurality of sub-images, according to the pixels and matching pixels thereof;
  merging the plurality of sub-images, according to overlapping between the sub-images; and
  determining an image segmentation result, according to a result of the merging.

6. The segmentation method according to claim 5, wherein the merging the plurality of sub-images, according to overlapping between the sub-images comprises:
  calculating the number of pixels contained in an intersection between a first sub-image and a second sub-image;
  determining an overlapping parameter for indicating the overlapping, according to a ratio of the number of the pixels contained in the intersection to the number of pixels contained in the first sub-image; and
  merging the first sub-image with the second sub-image, when the overlapping parameter is greater than a threshold.

7. The segmentation method according to claim 1, further comprising:
  determining interference pixels, according to pixel value distribution of pixels in an original image;
  determining matching pixels of the interference pixels, according to the pixel values of the pixels in the original image; and
  removing the interference pixels and the matching pixels thereof from the original image to acquire the image to be segmented.

8. The segmentation method according to claim 1, wherein the image to be segmented is a two-dimensional image generated according to acquired underwater sonar data.

9. An image three-dimensional reconstruction method, comprising:
  performing image segmentation on an image to be segmented, according to the segmentation method of claim 1; and
  performing three-dimensional reconstruction according to a result of the segmentation to acquire a three-dimensional image.

10. An image segmentation apparatus comprising at least one processor, wherein the at least one processor is configured to perform the steps of:
  dividing pixels in an image to be segmented among different pixel sets, according to color gamut ranges to which pixel values of the pixels belong;
  within each pixel set, determining matching between pixels in a same pixel set according to the pixel values; and
  performing image segmentation on the image to be segmented according to the matching;
  in a coordinate system with red, green, and blue components of pixel values as variables, dividing a color gamut cube composed of the red, green, and blue components into a plurality of color gamut sub-cubes as the color gamut ranges;
  determining one of a vertex of the color gamut cube contained in each color gamut sub-cube, a central point of each color gamut sub-cube or a mean value point of each color gamut sub-cube as a characteristic pixel value of color gamut range corresponding to the each color gamut sub-cube; and
  determining the color gamut range to which the pixel value of each pixel in the image to be segmented belongs, according to the characteristic pixel value;
  wherein the determining the color gamut range to which the pixel value of the each pixel in the image to be segmented belongs comprises:
  obtaining an eigenvector of the each pixel and an eigenvector of a characteristic pixel, using a processor;
  calculating a vector distance between the eigenvector of the each pixel and the eigenvector of the characteristic pixel, using the processor; and
  determining the color gamut range to which the pixel value of the each pixel belongs based on the vector distance, using the processor; and
  the determining matching between the pixels in each pixel set according to pixel values, respectively comprises:
  selecting one pixel in any pixel set as a seed pixel;
  calculating differences between the pixel value of the seed pixel and pixel values of other pixels in the pixel set; and
  determining whether the other pixels are matched with the seed pixel, according to the differences.

11. An image three-dimensional reconstruction apparatus comprising at least one processor, wherein the at least one processor is configured to perform the steps of:
  performing image segmentation on an image to be segmented, according to the segmentation method of claim 1; and performing three-dimensional reconstruction according to a result of the segmentation to acquire a three-dimensional image.

12. An electronic device comprising:
a memory; and
a processor coupled to the memory, wherein the processor is configured to perform the image segmentation method according to claim 1.

13. A non-transitory computer-readable storage medium having stored thereon computer programs which, when executed by a processor, implement the image segmentation method according to claim 1.

14. A wearable device comprising:
the image three-dimensional reconstruction apparatus according to claim 11; and
a display screen configured to display a three-dimensional image acquired by the three-dimensional reconstruction apparatus.

15. The wearable device according to claim 14, wherein the three-dimensional reconstruction apparatus is configured to generate an image to be segmented, according to acquired underwater sonar data, and reconstruct the three-dimensional image, according to a segmentation result of the image to be segmented.

16. An electronic device comprising:
a memory; and
a processor coupled to the memory, wherein the processor is configured to perform the image three-dimensional reconstruction method according to claim 9 based on instructions stored in the memory.

17. A non-transitory computer-readable storage medium having stored thereon computer programs which, when executed by a processor, implement the image three-dimensional reconstruction method according to claim 9.

\* \* \* \* \*